United States Patent [19]

Brown et al.

[11] Patent Number: 4,731,695

[45] Date of Patent: Mar. 15, 1988

[54] CAPACITOR AND METHOD FOR MAKING SAME WITH HIGH YIELD

[75] Inventors: Richard Brown, Berkeley Heights Township, Union County; Phillip C. Jozwiak, Plainsboro Township, Middlesex County; Saligrama N. Subbarao, West Windsor Township, Mercer County, all of N.J.

[73] Assignee: General Electric Company, Schenectady, N.Y.

[21] Appl. No.: 15,478

[22] Filed: Feb. 17, 1987

[51] Int. Cl.⁴ .................. H01G 3/07; H01G 4/08; H01G 7/00

[52] U.S. Cl. ................................ 361/313; 29/25.42; 361/323

[58] Field of Search ............... 361/433, 321, 320, 311, 361/312, 313, 322, 323; 29/25.42

[56] References Cited

U.S. PATENT DOCUMENTS

| | | | |
|---|---|---|---|
| 2,793,970 | 5/1957 | Jeppson | 361/323 X |
| 3,231,479 | 1/1966 | Gordon et al. | 361/313 X |
| 3,234,442 | 2/1966 | Maissel et al. | 29/25.42 X |
| 3,273,033 | 9/1966 | Rossmeisl | 29/25.42 X |
| 3,466,719 | 9/1969 | Sharif et al. | 361/313 X |
| 3,596,370 | 8/1971 | Gabrail | 361/433 |
| 3,819,990 | 6/1974 | Hayashi et al. | 361/313 |
| 4,432,035 | 2/1984 | Hsieh et al. | 361/313 X |

FOREIGN PATENT DOCUMENTS

| | | | |
|---|---|---|---|
| 231448 | 12/1985 | German Democratic Rep. | 361/313 |
| 133526 | 10/1980 | Japan | 361/313 |

*Primary Examiner*—Donald A. Griffin
*Attorney, Agent, or Firm*—Henry I. Steckler; Allen LeRoy Limberg

[57] ABSTRACT

A capacitor comprises a pair of electrodes with an insulator between the electrodes. The insulator has a primary dielectric with at least one void. A fill dielectric is in the void to improve yield.

A method of making a capacitor comprises forming a first electrode, forming a primary dielectric having a void over the electrode, forming a fill dielectric in the void, and forming a second electrode over the dielectrics.

18 Claims, 4 Drawing Figures

CAPACITOR AND METHOD FOR MAKING SAME WITH HIGH YIELD

BACKGROUND OF THE INVENTION

The present invention relates to a capacitor and a method of making it, and more particularly, to a thin film MIM (metal-insulator-metal) capacitor and a method for making it that results in a high yield.

When making thin film capacitors, a first electrode is formed on a substrate, an insulator is formed overlying the first electrode, and a second electrode is formed overlying the insulator. However, during the formation of the insulator, void-type defects, such as cracks, thin areas, and pin holes, occur, which reduce the electrical dielectric strength, thereby reducing the yield of the process.

It is, therefore, desirable to have a capacitor and a method for making it that results in a high yield.

SUMMARY OF THE INVENTION

A capacitor comprises a first electrode, an insulator overlying said first electrode, said insulator including a primary dielectric having at least one void and a fill dielectric disposed in said void, and a second electrode overlying said insulator.

A method for making a capacitor comprises forming a first electrode, forming an insulator overlying said first electrode by forming a primary dielectric having at least one void and forming a fill dielectric in said void, and forming a second electrode overlying said insulator.

DETAILED DESCRIPTION OF THE PREFERRED EMBODIMENTS

Figure 1:
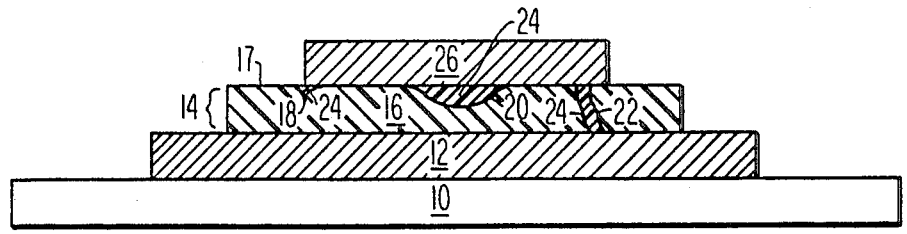
FIG. 1 is a cross-sectional view of an embodiment of a capacitor in accordance with the invention.

In FIG. 1 there is shown an insulating substrate 10. Overlying the substrate 10 is a first electrode 12, while overlying the first electrode is an insulator 14 comprising a primary dielectric 16 having voids, such as a crack 18, a thin area 20 and a pin hole 22, that communicate with an upper surface 17 of the primary dielectric 16. Within each void 18, 20, and 22 is a fill dielectric 24. Overlying the insulator 14 is a second electrode 26. Preferably, the second electrode 26 is recessed from the insulator 14, which is recessed from the first electrode 12, which in turn is recessed from the substrate 10, all as shown in FIG. 1, to avoid undercutting during manufacture (described below).

The substrate 10 can comprise an insulator, such as $Al_2O_3$, BeO, AlN, or $BaTiO_3$. The first and second electrodes 12 and 26 can comprise a heavily doped semiconductor, such as Si, GaAs, or InP, or a metal or combination of metals, such as Al, Cr-Cu, or Ti-Pt-Au having a typical thickness between about 1 to 3 micrometers ($\mu$m). The primary dielectric 16 can comprise $SiO_2$, $Si_3N_4$, $Al_2O_3$, $BaTiO_3$, MgO, or $Ta_2O_5$. In general, the lower thickness limit for the primary dielectric is determined by the applied voltage stress, i.e., it is necessary to avoid voltage breakdown, while the upper thickness limit is determined by mechanical stress. For $Si_3N_4$ typical satisfactory thicknesses are between about 0.25 to 1$\mu$m, while for $Ta_2O_5$ satisfactory thickness are between about 0.15 to 0.215$\mu$m. The fill dielectric can comprise an curable liquid material, such as a polyimide, e.g., the polyimides sold under the trademarks "Pyralin 25 45" or "Pyralin 25 55" by E. I. Dupont Company, Wilmington, Del.

Figure 2:
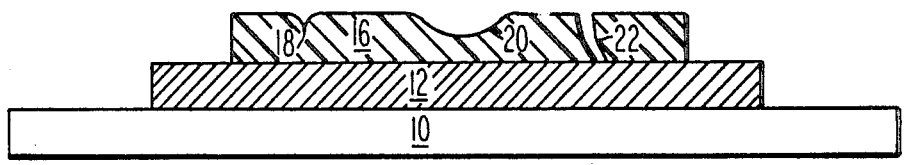
FIGS. 2–4 are cross-sectional views illustrating successive steps of an embodiment of a method in accordance with the invention for making the capacitor of FIG. 1.

FIG. 2 shows the first steps in making the capacitor of FIG. 1. For a substrate 10 of $Al_2O_3$, the first electrode 12 is formed by vapor deposition such as by evaporating Cr in an $O_2$ atmosphere having a pressure $2 \times 10^{-5}$ Torr to form a $Cr_2O_3$ layer (not shown) having a thickness of about 15 nanometers (nm) to obtain good adherence to the substrate 10. Then Cr is evaporated in a vacuum to form a first Cr layer (not shown) of about 25 nm thickness in order to provide a good conductance and transition to a Cu layer (not shown). Thereafter, the Cu layer is formed with a thickness of about 2 $\mu$m by evaporating Cu in a vacuum, and then a second Cr layer (not shown) is formed with a thickness of about 12 nm to provide good adhesion to the primary dielectric 16. Other forms of vapor deposition such a sputtering can also be used to form all of the layers the first electrode 12.

To form the primary dielectric 16 by sputtering, a target of $Si_3N_4$ can be bombarded by ions of $N_2$ and Ar. Alternately, the primary dielectric 16 can be formed by plasma enhanced chemical vapor deposition by reacting $SiH_4$ and $NH_3$ at about 250° C. Whatever method is used, the voids 15, 20, and 22 will occur during the formation of the primary dielectric 16 due to imperfections thereof. Then a first photoresist layer (not shown) is deposited and defined in order to be able to define the primary dielectric 16 (described below). Thereafter, the primary dielectric 16 of $Si_3N_4$ is defined using a wet etchant, such as HF, or dry etching using a plasma of $CF_4$. The first photoresist layer is then removed using a photoresist etchant, such as KOH, NaOH, an amine, or a plasma of $O_2$.

Thereafter, the second Cr layer is removed using a Cr etchant, such as a mixture of KOH and $K_3FeO(CN)_6$, and a second photoresist layer deposited and defined. Then the Cu layer is etched using a Cu etchant such as $FeCl_3$ and the second photoresist layer removed. The second photoresist layer is removed and then the first Cr layer and the $Cr_2O_3$ etched.

Figure 3:
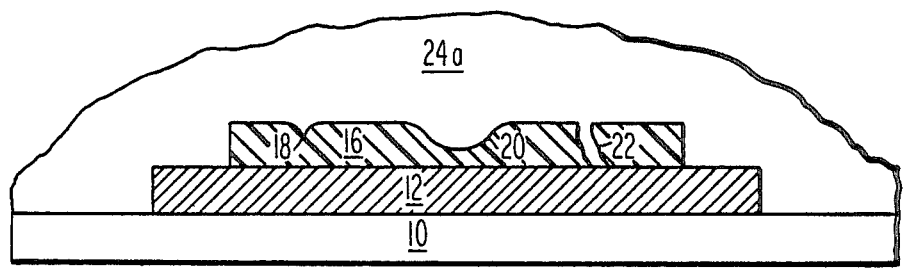
Figure 4:
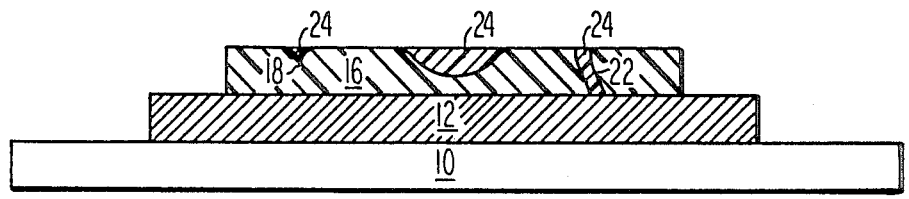

As shown in FIG. 3, a liquid polyimide layer 24a is deposited by spin coating, with a thickness between about 1 to 2 $\mu$m thereby filling in the voids 18, 20, and 22. The layer 24a is then partially cured between about 125° to 130° C. for about ½ hour if photoresist strippers are used in a step described below. The layer 24a is then etched using a photoresist developer, typically for between about 30 to 60 seconds. During the etching the polyimide remains in the voids 18, 20, and 22 since it is thicker, etchant accessibility is limited, and due to the partial curing (if used). Thus the fill dielectric 24 as shown in FIG. 4 is formed, while that portion of the layer 24a outside of the voids 18, 20, and 22 is removed. A photoresist stripper is then applied if definition of the polyimide at locations not shown is desired. The fill dielectric 24 is then cured between about 300° to 400° C. for about ½ to 1½ hours in an inert atsmophere such as $N_2$.

The second electrode 26 is then formed. It can be similar to the first electrode, i.e., a first layer of $Cr_2O_3$ (not shown), a layer of Cr, and then a layer of Cu or Ti-Cu. Thickness can be similar except that the layer of Cu or Ti-Cu has a typical thickness of up to about 3μm. These layers can be formed by vapor deposition. A third photoresist layer is then deposited and defined. Thereafter, the Cu, Cr, and $Cr_2O_3$ layers are successively etched, and the third photoresist layer removed.

EXAMPLE

Capacitors made as described above were subject to a test using an electrical field of 1 Megavolt/cm. They were considered to have passed the test if no breakdown occurred and if their capacitance increased by less than 10% compared with their initial capacitance at zero volts. A yield of 91% was obtained.

COUNTEREXAMPLE

In contradistinction, identical capacitors except that no fill dielectric 24 was used had a yield of 73%.

What is claimed is:

1. A capacitor comprising:
    a first non-anodizable electrode;
    an insulator overlying said first electrode, said insulator including a primary dielectric having an upper surface and at least one void communicating only with said upper surface, and a fill dielectric disposed in said void; and
    a second electrode overlying said insulator.

2. The capacitor of claim 1 wherein said primary dielectric has a plurality of voids, said fill dielectric being disposed in all of said voids.

3. The capacitor of claim 2 wherein said voids are at least three in number and comprise a pin hole, a crack, and a thin area, respectively.

4. The capacitor of claim 1 wherein said fill dielectric comprises a curable material.

5. The capacitor of claim 4 wherein said curable material comprises a polyimide.

6. The capacitor of claim 1 wherein said primary dielectric comprises a compound selected from the group consisting of $SiO_2$, $Si_2N_4$, $BaTiO_3$, $MgO$, and $Ta_2O_5$.

7. The capacitor of claim 1 wherein said electrodes comprise a doped semiconductor.

8. The capacitor of claim 1 wherein said electrodes are metallic.

9. The capacitor of claim 1 wherein said second electrode is recessed from said insulator and said insulator is recessed from said first electrode.

10. A method for making a capacitor, said method comprising:
    forming a first non-anodizable electrode;
    forming an insulator overlying said first electrode by forming a primary dielectric having an upper surface and at least one void communicating only with said upper surface and forming a fill dielectric in said void; and
    forming a second electrode overlying said insulator.

11. The method of claim 10 wherein said fill dielectric is formed by applying a curable liquid material to said primary dielectric, securing that portion of said material in said void during a subsequent removal step by partially curing said material, thereafter removing that portion of said material outside of said void, and curing the remaining portion of said material in said void.

12. The method of claim 11 wherein said applying step comprises spin coating.

13. The method of claim 11 wherein said partial curing step comprises heating to between about 125° to 130° C. for about one half hour.

14. The method of claim 11 wherein said removing step comprises etching.

15. The method of claim 11 wherein said step of curing the remaining portion comprises heating between about 300° to 400° C. for about ½ to 1½ hours.

16. The method of claim 11 wherein said material comprises a polyimide.

17. The method of claim 11 wherein said electrodes are formed by sputtering.

18. The method of claim 11 wherein said electrodes are formed by vapor deposition.

* * * * *